United States Patent [19]

Buhrer

[11] Patent Number: 4,597,640
[45] Date of Patent: Jul. 1, 1986

[54] OPTICAL POLARIZATION RESTORATION APPARATUS

[75] Inventor: Carl F. Buhrer, Framingham, Mass.

[73] Assignee: GTE Laboratories Incorporated, Waltham, Mass.

[21] Appl. No.: 672,035

[22] Filed: Nov. 16, 1984

[51] Int. Cl.$^4$ .............................................. G02B 27/28
[52] U.S. Cl. .................................... 350/405; 350/403; 350/407
[58] Field of Search ................... 350/96.15, 96.24, 385, 350/387, 393, 403, 405, 407; 372/27; 356/369

[56] References Cited

U.S. PATENT DOCUMENTS 3,177,761  4/1963  Redner .............................. 350/403

FOREIGN PATENT DOCUMENTS 38501  3/1980  Japan ................................ 350/393
203412  11/1983  Japan ............................. 350/96.15

OTHER PUBLICATIONS

Hardy, W. A. "Coupled Mode Switching Device", IBM Tech. Disc. Bull., 11-1964, pp. 480-481.
Jackson et al, "Elimination of Drift in a Single-Mode Optical Fiber Interferometer Using Piezoelectrically Stretched Coiled Fiber", App. Optics, 9-1980, pp. 2926-2929.
Mohr et al, "Active Polarization Stabilization System for Use with Coherent Transmission Systems or Fibre-Optic Sensors", Proc. 9th Europ. Conf. on Opt. Comm., Geneva, Switz., 10-1983, pp. 313-316.
EP98730, 1-1984, European Patent App., Shirasaki.
Kubota et al, "Electro-Optical Polarization Control on Single-Mode Optical Fibres", Electronics Letts., 7-1980, p. 573.
Martinelli, M., "Unlimited Phase Compensator for Fiber-Optic Interferometric Detection of Slow Temperature Change", Optics Letts., 9-1984, pp. 429-431.

Primary Examiner—William H. Punter
Attorney, Agent, or Firm—Fred Fisher

[57] ABSTRACT

An active system for restoring the polarization state of light emerging from a single-mode optical fiber. The system changes the slowly varying elliptical polarization resulting from environmental effects on the long fiber to a linear polarization state of fixed orientation. The elliptically polarized light is converted into two orthogonal linearly polarized beams. One of the beams is used in a feedback circuit to null its intensity thereby restoring all the input light to the other linear polarization state.

10 Claims, 2 Drawing Figures

OPTICAL POLARIZATION RESTORATION APPARATUS

BACKGROUND OF THE INVENTION

1. Field of the Invention

This invention relates to new and improved apparatus for restoring the polarization state of light emerging from an optical fiber. In particular, it relates to a new and improved active system for restoring the polarization of light emerging from a single-mode optical fiber link. Accordingly, it is a general object of this invention to provide new and improved apparatus of such character.

2. General Background

The single-mode fibers that are used in 1.2 $\mu$m to 1.6 $\mu$m optical communication systems nominally have circular symmetry and can transmit two orthogonally polarized light waves with essentially equal propagation constants. When a linearly polarized laser is coupled into such a fiber, the light output at a detector end of the optical fiber likely has a different polarization state due to birefringent effects of small differences in propagation constants of the two fiber modes caused by deviations from core circularity, strains, or other environmental effects.

Such effects as bending, twisting, or mounting are discussed in the literature, including "Linear polarization in birefringent single-mode fibers" by R. H. Stolen, V. Ramaswamy, P. Kaiser, and W. Pleibel, *Appl. Phys. Lett.* 33 (8) pp. 699–701 (1978) and "Polarization effects in short length, single-mode fibers" by V. Ramaswamy, R. D. Standley, D. Sze, and W. G. French, *The Bell System Technical Journal* 57 (3) pp. 635–651 (1978).

The change in polarization state may be inconsequencial for some optical receivers. However, when optical processing of light through polarization sensitive devices is desired, the polarization of the light should first be restored to a reference polarization state. Polarization sensitive devices, such as micro-optical thin film electro-optical switches and modulators, are discussed in "Performance limitations imposed on optical waveguide switches and modulators by polarization", R. A. Steinberg and T. G. Giallorenzi, *Applied Optics* 15 (10) pp. 2440–2453 (1976).

An optical fiber is not necessarily perfectly circular throughout its entire length. Stresses along the fiber are not necessarily completely symmetrical about its central axis. Temperatures can vary at different portions of the fiber, etc., so that if a horizontally polarized light is applied to one end, such horizontally polarized light would not likely be emitted from the opposite end due to birefringence of the fiber. Most likely, the output from the fiber would be elliptically polarized, with varying degrees of ellipticity between linear polarization and circular polarization, and with the major elliptic axis at an arbitrary orientation angle relative to some reference orientation.

Apparatus for restoring the polarization state of light emerging from a single-mode optical fiber should be active, because the fiber link birefringence is subject to slow changes due to mechanical and thermal variations along its length. Previous approaches to restoring the polarization state required that some fraction of the optical signal be diverted from the desired output so that its polarization state could be sensed to provide a feedback signal for controlling the polarization compensating elements. Such approaches are described in "Polarization stabilization on single-mode fiber", R. Ulrich *Appl. Phys. Lett.* 35(11) pp. 840–842 (1979) and "Electro-optical polarization control on single-mode optical fibres" M. Kubota, T. Oohara, K. Furuya, and Y. Suematsu, *Electr. Lett.* 16 (15) p. 573 (1980). The polarization compensation has been accomplished using linear birefringence obtained by applying transverse compression to a section of optical fiber by means of two electromagnets or by applying electrical signals to electro-optic elements, transmitting the light after it emerges from the fiber. In both cases, the resulting polarization was sampled using an essentially polarization-insensitive beamsplitter and a set of four photodetectors each fitted with a polarization-sensitive filtering device. Prior art devices utilized, typically, a fixed percentage of output light for determining its polarization state. A sample of its intensity was then returned to the system to control the compensation of the light traveling therethrough.

A common problem with all prior art devices is the finite range of the birefringence that could be produced. This is because, as a birefringent effect of the compensator is varied to compensate for any random variations in the input polarization state, it is possible that a limiting value is reached beyond which it cannot operate. At that point, it has to shut down, requiring restarting. The compensator is set to its mid-range and then varied. During that reset process, the signal likely drops out. The receiving system that requires a linearly polarized output does not get the linearly polarized output. In lieu thereof, a spurious output occurs for a transient period, until the device is reset.

SUMMARY OF THE INVENTION

Another object of this invention is to provide a new and improved optical polarization restoration apparatus that does not require the allocation of a significant fraction of available light intensity for determining its polarization state.

Still another object of the invention is to provide a new and improved polarization restoration apparatus that only requires electrical energy to respond to changes in its input polarization state.

Yet another object of this invention is to provide a new and improved continuous polarization restoration apparatus that can not reach a limit beyond which it must be reset.

Still yet another object of this invention is to provide a new and improved polarization restoration apparatus which avoids the necessity of high applied voltages or currents, high frequency phase lock loops, and the like.

In accordance with one aspect of the invention, apparatus for restoring the polarization state of light emerging from an optical fiber can include means for coupling to the fiber for receiving light therefrom and for focusing same into a parallel beam that has a polarization state that is, in general, elliptically polarized with an arbitrary ellipticity and orientation of its major axis. Compensating means convert the generally elliptically polarized beam to a linear polarized beam. Polarization beam splitting means, coupled to the converted beam from the compensating means, cause light at one linear polarization state to traverse a first path as an output beam and cause light at a second linear polarized state to traverse a second path. The second polarized state is orthogonal to the first polarized state. Means responsive to light intensity traversing the second path control the compensating means.

In accordance with certain specific features of the invention, the responsive means continues to control the compensating means until the light intensity that traverses the second path reaches a null. The responsive means can include a photodetector coupled to receive light at the second polarized state.

In accordance with another aspect of the invention, apparatus for restoring the polarization state of light emerging from an optical fiber includes compensating means for changing the polarization state of light emerging therefrom. Means are provided for separating the light from the compensating means into two components: one linearly polarized beam as a desired output beam, and a second linearly polarized beam. The second beam has a polarization state orthogonal to that of the first beam. Means responsive to the second beam control the compensating means.

In accordance with a specific feature of the invention, the means for controlling the compensating means is responsive to the intensity of the second beam.

In accordance with still another aspect of the invention, apparatus for restoring the polarization state of light emerging from an optical fiber includes means for receiving light therefrom and focusing it into a parallel beam along an axial path. A pair of birefringent plates adapted to be rotated about the axial path are oriented therealong. Polarization beam splitting means oriented along the path subsequent to the two plates cause light from one linear polarization state to traverse in a first direction and cause light from a second linear polarization state to traverse in a second direction. The two states are orthogonal to each other. Motors are provided for rotating the two plates about their common axis. A photodetector responsive to light traversing in the second direction is provided. Control means are coupled to the photodetector for controlling amount and direction of rotation of both the first motor and the second motor.

In accordance with specific features of the invention, the two directions can be vertical and horizontal. The light of one linear polarization state passes through the beam splitting means, and light of the second polarization state is reflected perpendicular to the first direction. The first plate can be a quarter-wave plate and the second plate can be a half-wave plate for a specific wavelength of light that passes through the fiber. Alternatively, the first plate can be a half-wave plate and the second plate can be a quarter-wave plate for a specific wavelength of light to be passed through the fiber.

BRIEF DESCRIPTION OF THE DRAWINGS

Other objects, advantages and features of this invention, together its construction and mode of operation, will become more apparent from the following description, when read in conjunction with the accompanying drawings, in which.

DESCRIPTION OF PREFERRED EMBODIMENT(S)

Figure 1:
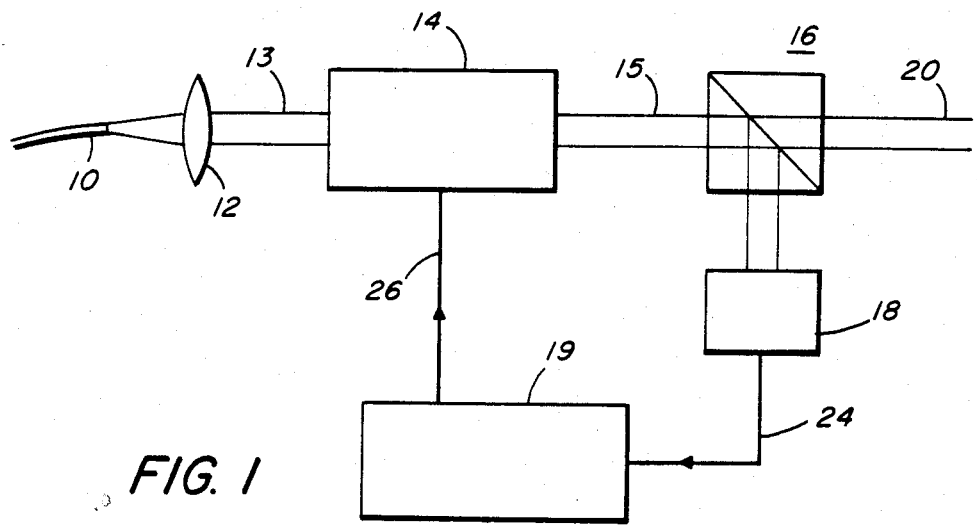
FIG. 1 is a block diagram of one embodiment of this invention.

A general embodiment of the invention is shown in FIG. 1 which depicts an optical fiber 10 having its light output coupled to a converging lens 12. The converging lens 12 focuses diverging light from the fiber 10 into a parallel beam 13 that is directed to a compensator 14. The compensator 14, desirably, converts the polarization of the light to linear, onto a beam 15 which is directed to a polarizing beamsplitter 16. The beamsplitter 16 provides a desired linearly polarized beam as an output 20. The other perpendicular polarized state is reflected by the beamsplitter 16 into a photodetector 18 whose output signal 24 is fed to a controller 19 to cause its output signal 26 to modify the compensator 14.

In operation, light emerging from the end of a long single-mode fiber 10 diverges and is focused into a parallel beam 13 by the converging lens 12. The light beam 13 has a polarization state that is, in general, elliptically polarized with an arbitrary ellipticity $\chi$ and orientation of the major axis $\psi$. (This notation is as described in "Principles of Optics" M. Born and E. Wolf, MacMillan & Co., New York, p. 26 (1959).

The beam 13 is then passed through the compensator 14 which converts the polarization of the light beam 13 to linear such that full intensity of the light passes undeflected through the polarizing beamsplitter 16 to yield the output 20.

The beamsplitter 16 can be constructed of calcite or can be a glass prism device with a multilayer thin film structure on its diagonal interface such that one linear polarization state travels through the prism to yield the output 20, while the other perpendicularly polarized state is reflected into the photodetector 18. The compensator 14 can be constructed such that, given the proper control signals 26, any input polarization can be made linear so as to completely pass through as the output 20. As the polarization emerging from the fiber 10 changes, the input beam 13 changes, and, without further correction by the control signals 26, the beam 15 would no longer be linearly polarized. Instead, it would be split into two linearly polarized components by the polarizing beamsplitter 16. Some fraction of the total intensity would be deflected to the photodetector 18, while the remainder would appear as a linearly polarized output 20. The output signal 24 from the photodetector 18 is fed to the controller 19. The controller 19 adjusts its outputs 26 to modify the compensating device 14. The controller 19, preferably, makes small changes in the control signals 26. The controller 19 determines the effects of such control signals by receiving the output 24 from the photodetector 18. The controller 19 continues to adjust the control signals 26 until a null is produced in the photodetector signal 24. When a null is reached, the full intensity available from the fiber is presented as the output 20.

The polarization compensator can be constructed in various ways without departing from the spirit and scope of this invention. However, in each case, two control variables are believed to be required to convert an arbitrarily polarized input into a linearly polarized output. Two electrically controlled linear birefringent elements can be used with their principal axes in fixed positions 45° apart in rotational orientation. Alternatively, one such variable retardation plate could suffice where its principal axes are electrically or mechanically rotatable. In another construction, two birefringent plates with fixed retardation can be mounted in sequence along the light beam such that each can be independently rotated by small motors. This latter preferred construction is depicted schematically in FIG. 2. This construction avoids the need for a continuous energizing signal to maintain the birefringent compensating effects and there are no limits beyond which it must be reset.

Figure 2:
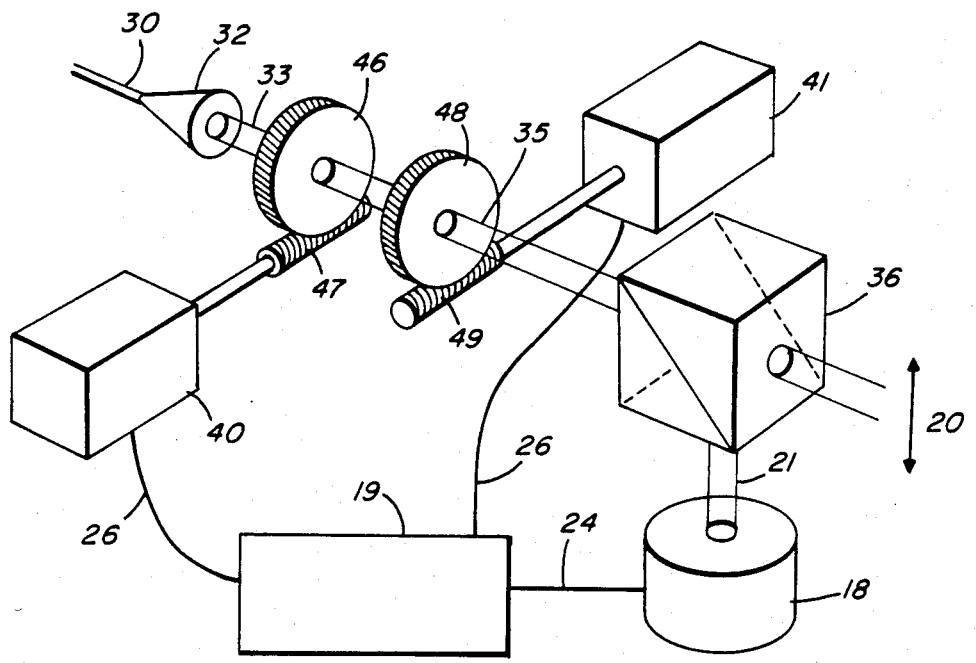
FIG. 2 is a diagram of a more specific embodiment of the invention depicted in FIG. 1.

Referring to FIG. 2, the receiving end of a fiber link 30 is terminated by a lens connector 32 which focuses the diverging wave from the fiber tip into a narrow parallel beam 33. The beam 33 passes successively through birefringent plates 46, 48, each mounted in the center of gears driven by worm drives 47, 49. The worm drives 47, 49 are rotated by small stepping motors 40, 41, respectively. After passing through the birefringent plates 46, 48 which constitute the polarization compensator 14 of FIG. 1, the beam 35 enters the polarizing beamsplitter 36 where its horizontally polarized component 21 is reflected downward into a photodetector 18, while its vertically polarized component 20 exits as the polarization restored system output.

The birefringent plates 46, 48 have retardation values from one-fourth to one-half wavelength for the light wavelength being processed. In the preferred embodiment, the birefringent plate 46 is a quarter-wave plate and the birefringent plate 48 is a half-wave plate; however, the opposite sequence performs equally as well. Other values for the birefringent plate retardations may not necessarily be able to follow and continuously compensate for all changes in the input polarization state.

The output 24 from the photodetector 18, an analog signal, is connected to the controller 19 within which it is digitized and processed in digital form by a microcomputer. The controller output 26 provides a sequence of current pulses on four pairs of leads (only one shown) to each of the two stepping motors 40, 41. The motors 40, 41 provide proper rotation of birefringent plates 46, 48 via mechanical coupling through the motors 40, 41 and worm gears 47, 49.

An understanding of the functioning of the controller 19 is facilitated by the following: The intensity of the horizontally polarized component of the light at point 35 (FIG. 2), as measured by the photodetector 18, is a function of two variables $\theta_1$ and $\theta_2$, the orientation angles of the fast axes of the birefringent plates 46, 48. The purpose of the controller 19 is to find a set of values for the two angles for which the photodetected intensity is zero or at least below some predetermined level which represents a negligibly small light loss from the output 20. Starting at any point in the plane defined by those two variables $\theta_1$ and $\theta_2$, this may be accomplished by the following control algorithm. First, the signal output 24 from the photodetector 18 is measured with the birefringent plates 46, 48 set at some initial values of $\theta_1$ and $\theta_2$. Next, the signal input 24 to the controller 19 is measured at eight surrounding points displaced slightly by some combination of 0 or $\pm\Delta$ (some small value such as 3°) from both initial angular values of $\theta_1$ and $\theta_2$. The minimum value of these measurements determines the direction in the $\theta_1$ and $\theta_2$ plane along which corrections should be applied so as to decrease the signal input along the line 24. Successive corrections of magnitude $\Delta$, for example, are then made until the signal input along the line 24 no longer decreases. Then, the above direction finding process is repeated to redirect the correction process toward the ultimate minima in the signal input 24. To avoid continuous hunting, some predetermined level of signal input is chosen below which the $\theta_1$ and $\theta_2$ angular correction processes are suspended. The rate at which the controller 19 performs the correction process on the angular orientations of birefringent plates 46, 48 determines the tracking ability of the system. For example, with $d\theta/dt$ equal to 180°/second, the system restored any input polarization state to linear polarization within one second. Environmental effects on the optical fiber birefringence are expected to be slow with significant changes in the received polarization state taking place on a time scale of several seconds. Thus, the above described embodiment of the present invention is expected to produce essentially complete and continuous conversion of the elliptically polarized light from the fiber 30 to a plane polarized output.

The conversion of an input wave of any elliptical polarization to a vertically polarized output wave by the compensator 14 can be described geometrically using the concept of the Poincare sphere or by using the Jones matrix algebra for birefringent elements. For the preferred configuration described with quarter-wave and half-wave plates 46, 48, respectively, the operation is simply as follows. The quarter-wave plate 46 is oriented with its principal axes parallel to the principal axes of the elliptically polarized input. This brings the two wave components back into phase to yield a linearly polarized wave. The half-wave plate 48 is then oriented with its principal axes midway between the orientation angle of this linearly polarized wave and the orientation angle of the desired vertically polarized output. Then, after passing through both birefringent plates 46, 48, the elliptical input to the compensator 14 has been converted to a vertically polarized linear output.

Thus, this invention contemplates an active polarization restoring system which combines a pair of polarization compensating birefringent elements followed by a polarizing beam splitter. The latter functions to both completely polarize the output and to separate an orthogonally polarized residual component which can be measured and nullified to adjust the component elements. Further, this invention contemplates a polarization restoring system, as above described, in which the polarization compensating elements have fixed retardation, but with the principal axes continuously rotatable in orientation under control of an active feedback system that requires input from only a single photodetector. This invention further provides for a polarization restoring system in which the compensating elements continue to function without applied power and which require inputs only when their compensating effects must be varied.

What is claimed is:

1. Apparatus for restoring the polarization state of light emerging from an optical fiber comprising
means for coupling to said fiber for receiving light therefrom and focusing same into a parallel beam that has a polarization state that is in general elliptically polarized with an arbitrary ellipticity and orientation of its major axis;
compensating means for converting the generally elliptically polarized beam to a linear polarized beam;
polarization beam splitting means coupled to the converted beam, from said compensating means, for causing light at one linear polarization state to traverse a first path as an output beam, and for causing light at a second linear polarized state to traverse a second path, said second polarized state being orthogonal to said first polarized state; and
means responsive to light traversing said second path for controlling said compensating means.

2. The apparatus as recited in claim 1 wherein the responsive means continues to control said compensating means until light traversing said second path reaches a null.

3. The apparatus as recited in claim 1 wherein said responsive means includes a photodetector coupled to receive light at said second linear polarized state.

4. Apparatus for restoring the polarization state of light emerging from an optical fiber comprising
compensating means for changing the polarization state of light emerging from said optical fiber;
means for separating light from said compensating means into two components: one linearly polarized beam as a desired output beam, and a second linearly polarized beam, said second beam having a polarization state orthogonal to that of said first beam; and
means responsive to said second beam for controlling said compensating means.

5. Apparatus as recited in claim 4 wherein the last named means is responsive to intensity of said second beam for controlling said compensating means.

6. Apparatus for restoring the polarization state of light emerging from an optical fiber comprising
means for receiving light from said fiber and focussing same into a parallel beam along an axial path;
a first birefringent plate adapted to be rotated about said axial path;
a second birefringent plate oriented along said path subsequent to said first plate, and adapted to be rotated about said axial path;
polarization beamsplitting means oriented along said path subsequent to said second plate for causing light of one linear polarization state to traverse in a first direction, and for causing light of a second linear polarization state to traverse in a second direction, said second state being orthogonal to said first state;
a first motor for rotating said first plate about said axial path;
a second motor for rotating said second plate about said axial path;
a photodetector responsive to light traversing in said second direction; and
control means coupled to said photodetector for controlling amount and direction of rotation of said first motor and said second motor.

7. The apparatus as recited in claim 6 wherein said first direction is vertical and said second direction is horizontal.

8. The apparatus as recited in claim 6 wherein said light of said one linear polarization state passes through said beamsplitting means, and wherein said light of said second linear polarization state is reflected perpendicular to said first direction.

9. The apparatus as recited in claim 6 wherein said first plate is a quarter-wave plate, and said second plate is a half-wave plate for a specific wavelength of light to be passed through said fiber.

10. The apparatus as recited in claim 6 wherein said first plate is a half-wave plate, and said second plate is a quarter-wave plate for a specific wavelength of light to be passed through said fiber.

* * * * *